(12) United States Patent
Tanaka et al.

(10) Patent No.: US 8,835,850 B2
(45) Date of Patent: Sep. 16, 2014

(54) HUMAN BODY SENSING DEVICE AND IMAGE PROCESSING APPARATUS HAVING THE SAME

(75) Inventors: Toshiaki Tanaka, Toyokawa (JP); Shiro Umeda, Toyokawa (JP); Kosuke Masumoto, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 41 days.

(21) Appl. No.: 13/467,733

(22) Filed: May 9, 2012

(65) Prior Publication Data

US 2012/0292510 A1 Nov. 22, 2012

(30) Foreign Application Priority Data

May 16, 2011 (JP) ................. 2011-109939

(51) Int. Cl.
*G01J 5/00* (2006.01)
*G01V 9/00* (2006.01)
*G01J 5/22* (2006.01)
*G01J 5/08* (2006.01)

(52) U.S. Cl.
CPC . *G01V 9/005* (2013.01); *G01J 5/22* (2013.01); *G01J 5/0806* (2013.01); *G01J 5/0025* (2013.01)
USPC ........................................................ 250/338.3

(58) Field of Classification Search
USPC ........................................................ 250/338.3
See application file for complete search history.

(56) References Cited

U.S. PATENT DOCUMENTS

2010/0204953 A1 8/2010 Onishi et al.

FOREIGN PATENT DOCUMENTS

| JP | 05-203762 A | 8/1993 |
| JP | 6-088875 A | 3/1994 |
| JP | 06-242226 A | 9/1994 |
| JP | 7-035872 A | 2/1995 |
| JP | 10-160856 A | 6/1998 |
| JP | 2000-329860 A | 11/2000 |
| JP | 2010-211781 A | 9/2010 |

OTHER PUBLICATIONS

Office Action (Notification of Reasons for Refusal) dated May 7, 2013, issued in corresponding Japanese Patent Application No. 2011-109939, and an English Translation of the Office Action. (7 pages).

*Primary Examiner* — David Porta
*Assistant Examiner* — Edwin Gunberg
(74) *Attorney, Agent, or Firm* — Buchanan Ingersoll & Rooney PC

(57) ABSTRACT

A human body sensing device being mounted on an object comprises: a first and second sensor being mounted on a vertical plane of the object and each having a pair of a positive and negative electrode; and a lens covering over the first and second sensors, wherein: the lens forms a sensing block in a sensing area constituting a plane perpendicular to the vertical plane, the sensing block including the positive and negative electrodes of the first sensor, and the positive and negative electrodes of the second sensor; either a first virtual line or an extended part thereof and either a second virtual line or an extended part thereof have a point of intersection in the sensing area; and the first and second virtual lines are symmetric with respect to a line perpendicular to the vertical plane of the object and passing through the point of intersection.

8 Claims, 7 Drawing Sheets

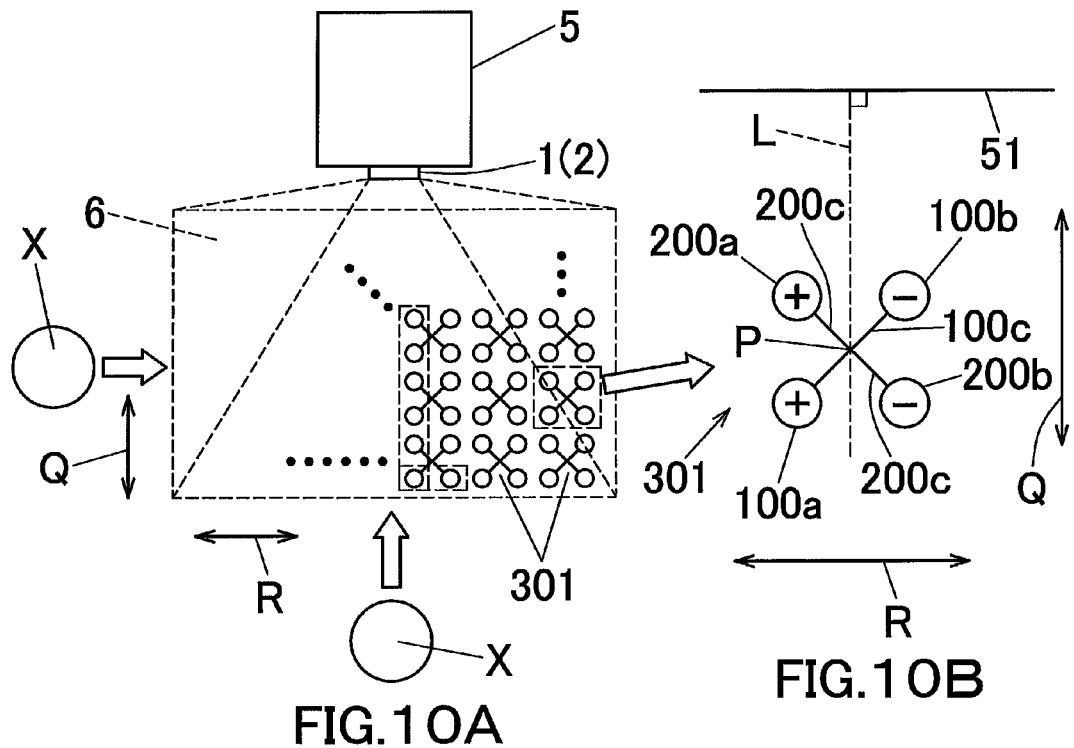
FIG.10A
FIG.10B
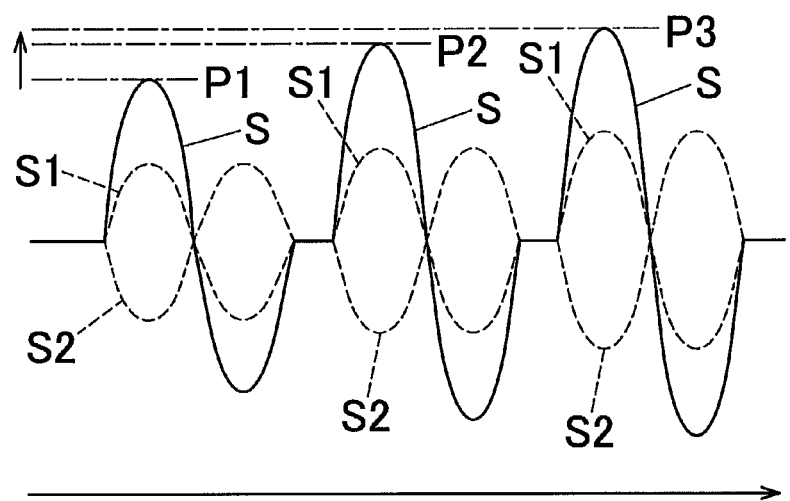
FIG.11

000
HUMAN BODY SENSING DEVICE AND IMAGE PROCESSING APPARATUS HAVING THE SAME

This application claims priority under 35 U.S.C. §119 to Japanese Patent Application No. 2011-109939 filed on May 16, 2011, the entire disclosure of which is incorporated herein by reference in its entirety.

BACKGROUND OF THE INVENTION

1. Field of the Invention

The present invention relates to a human body sensing device to detect a human body and an image processing apparatus with this human body sensing device being mounted thereon.

2. Description of the Related Art

The following description sets forth the inventor's knowledge of related art and problems therein and should not be construed as an admission of knowledge in the prior art.

Some of the image forming apparatuses such as copiers, printers, and facsimiles, and some of the multifunctional digital image forming apparatuses referred to as MFPs (Multi Function Peripherals) collectively having copier, printer, and facsimile functions and the like are provided with a human body sensing device which is allowed to detect a human body approaching, so that they immediately can exit sleep mode to get back to normal operation mode for a warm-up operation when detecting a human body near themselves.

For example, there commonly known is a human body sensing device consisting of a pyroelectric sensor (also referred to as "pyroelectric infrared sensor") with an energy-saving and low-cost configuration, being capable of performing human body detection.

When being installed on such an image processing apparatus, pyroelectric sensors are usually positioned in a certain manner so as to form a sensing area constituting a plane parallel with the direction in which a human body (user) approaches the image forming apparatus to use. However, the pyroelectric sensors usually are not very good enough to detect a human body moving across the sensing area because of too small changes in temperature. This is why there has been a considerable need for a human body sensing device achieving a higher accuracy in detecting a human body approaching.

Disclosed in Japanese Unexamined Patent Publication No. H10-160856 is a dual element pyroelectric sensor being characterized by outputting a signal whose phase is reversed when detecting a human body turning around, the dual element pyroelectric sensor being configured to identify the direction in which a human body is moving based on the waveform of its own signal.

Disclosed in Japanese Unexamined Patent Publication No. H06-088875 is a human body sensing device being provided with a pyroelectric element having two pyroelectric sensors fixed on one pyroelectric element plate, the human body sensing device being configured to have an intersection at an angle of 45 degrees induced by a horizontal floor and a virtual line connecting the two pyroelectric sensors, when being mounted on a vertical wall.

However, the technologies disclosed in the publications above would hardly be enough to achieve a higher accuracy in detecting a human body approaching, resulting in that there still needs to be such a human body sensing device.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a human body sensing device being mounted on an object, the human body sensing device comprising:
a first and second pyroelectric sensor being mounted on a vertical plane of the object and each having a pair of a positive and negative electrode; and
a lens covering over the first and second pyroelectric sensors,
wherein:
the lens forms a sensing block in a sensing area constituting a plane perpendicular to the vertical plane of the object, the sensing block including a first positive and negative field corresponding to the positive and negative electrodes of the first pyroelectric sensor, and a second positive and negative field corresponding to the positive and negative electrodes of the second pyroelectric sensor;
either a first virtual line connecting the first positive and negative fields or an extended part thereof and either a second virtual line connecting the second positive and negative fields or an extended part thereof have a point of intersection in the sensing area; and
the first and second virtual lines are symmetric with respect to an axis corresponding to a line perpendicular to the vertical plane of the object and passing through the point of intersection.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIGS. 10A and 10B are top views to explain that a plurality of sensing blocks are formed by the fly-eye lens in the sensing area;

FIG. 11 is a chart illustrating waveforms of sensing signals from a plurality of sensing blocks, explaining how to identify the direction in which a human body is moving based on the sensing signals;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, a mode of implementing the present invention will be described with reference to the accompanying drawings.

Figure 1:
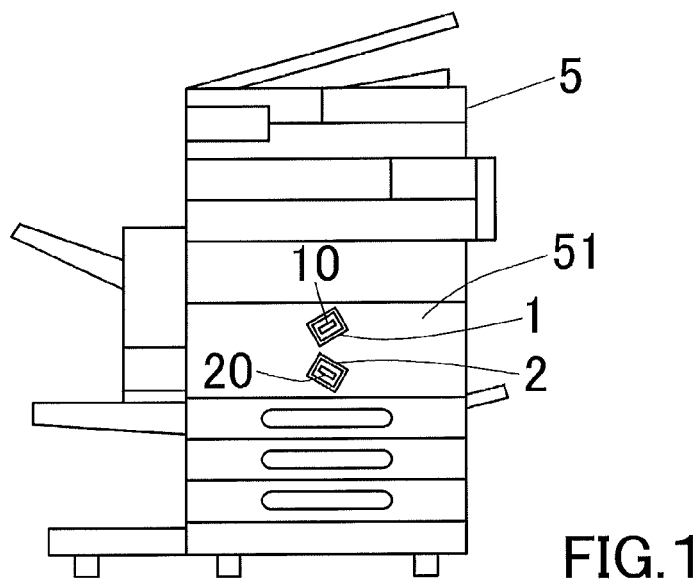
FIG. 1 is a front view of an image forming apparatus which is exemplified as an image processing apparatus with a human body sensing device according to one mode of implementing the present invention, being mounted thereon.

FIG. 1 is a front view of an image forming apparatus 5 which is exemplified as an image processing apparatus with a human body sensing device according to one mode of implementing the present invention, being mounted thereon;

As illustrated in FIG. 1, two sensing devices, a first sensing device 1 and a second sensing device 2, are mounted on a plane 51 constituting a vertical front panel of the image forming apparatus 5.

Figure 2A:
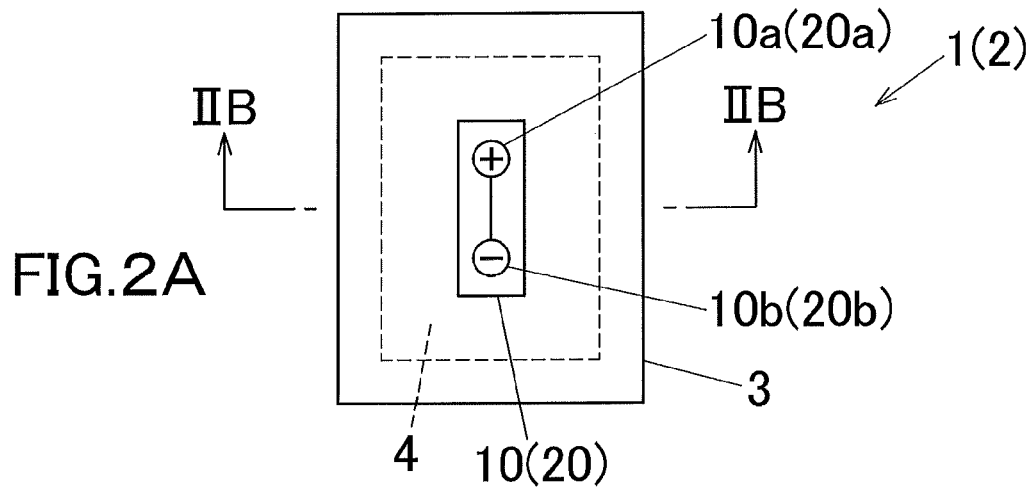
FIG. 2A is a two-dimensional view of a sensing device.
Figure 2B:
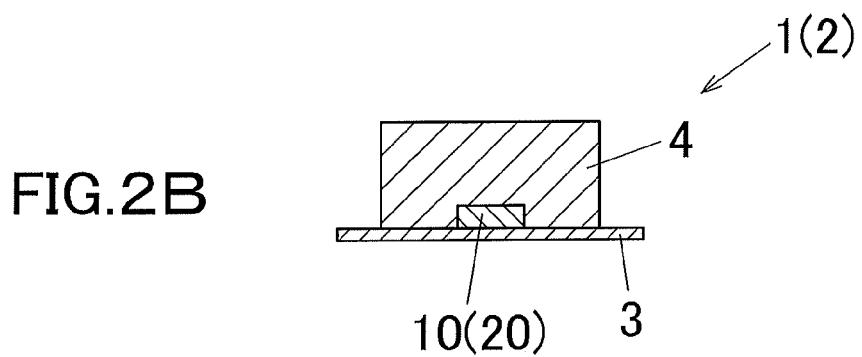
FIG. 2B is a cross-sectional view thereof taken along the line IBB-IBB.

As for the first sensing device 1, as illustrated in FIG. 2, a first pyroelectric sensor 10 having a positive electrode 10a and a negative electrode 10b is positioned in the central area of the upper surface of a base plate 3, and a lens 4 is mounted on the base plate 3 so as to cover over the first pyroelectric sensor 10. Similarly, as for the second sensing device 2, a second pyroelectric sensor 20 having a positive electrode 20a and a negative electrode 20b is positioned in the central area of the upper surface of a base plate 3, and a lens 4 is mounted on the base plate 3 so as to cover over the second pyroelectric sensor 20.

Figure 3:
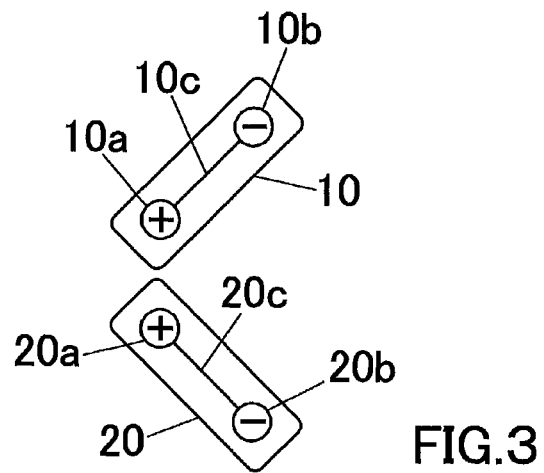
FIG. 3 is a view to explain that a first sensing device and a second sensing device are amounted on a plane of the image forming apparatus.

The first sensing device 1 and the second sensing device 2, which are represented by the first pyroelectric sensor 10 and the second pyroelectric sensor 20 as illustrated in FIG. 3, respectively, are positioned on the plane 51 of the image forming apparatus 5 in the shape of a lying "V" separated at the base with their ends of the positive electrodes 10a and 20a being very close to each other and their ends of the negative electrodes 10b and 20b being away from each other.

Figure 4A:
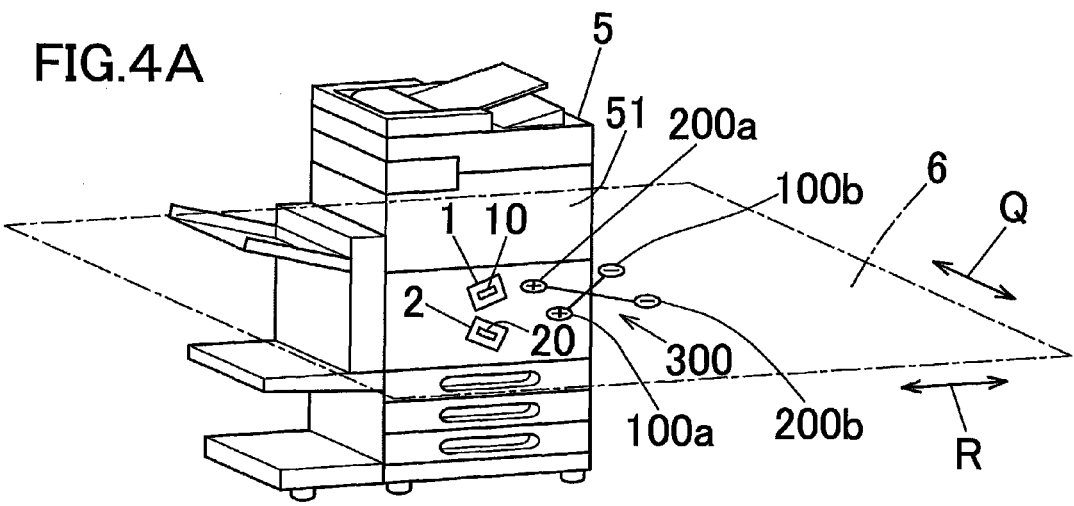
FIG. 4A is a diagrammatic perspective view to explain that a sensing block is formed in a sensing area which constitutes a plane perpendicular to the plane of the image forming apparatus on which the first and second sensing devices are mounted.

By positioning the first sensing device 1 and the second sensing device 2 thereon and adjusting the refractive indices of the lenses 4 and the focal lengths of the lenses 4, a pair of a first positive field 100a and a first negative field 100b, which correspond to the pair of the positive and negative electrodes 10a and 10b, are formed in a sensing area 6 which constitutes a horizontal plane perpendicular to the plane 51 of the image forming apparatus 5 as illustrated in FIG. 4A. Also thereby, a pair of a second positive field 200a and a second negative field 200b which correspond to the pair of the positive and negative electrodes 20a and 20b are formed in the sensing area 6. And these two pairs of positive and negative fields: the first positive field 100a, the first negative fields 100b, the second positive field 200a, and the second negative field 200b, jointly form one sensing block 300 in which a human body can be detected.

The sensing area 6 may constitute a vertical plane instead of a horizontal plane as long as it is perpendicular to the plane 51 of the image forming apparatus 5.

The sensing block 300 includes a first virtual line 100c connecting the first positive and negative fields 100a and 100b of the first pyroelectric sensor 10 and a second virtual line 200c connecting the second positive and negative fields 200a and 200b of the second pyroelectric sensor 20, while the first and second virtual lines 100c and 200c have an equal length and a point of intersection P almost in the middle of themselves. In the sensing area 6, the first and second virtual lines 100c and 200c are symmetric with respect to an axis corresponding to a line L perpendicular to the plane 51 of the image forming apparatus 5 and passing through the point of intersection P.

The sensing block 300 including the first and second virtual lines 100c and 200c which are symmetric with respect to an axis corresponding to the perpendicular line L is formed in the sensing area 6 for the following reasons.

That is, the first positive field 100a and either of the second positive and negative fields 200a and 200b which are symmetric with respect to the perpendicular line L have an equal distance from the plane 51 of the image forming apparatus 5; and the same is true for the first negative field 100b and either of the second positive and negative fields 200a and 200b which are symmetric with respect to the perpendicular line L. That allows the first and second pyroelectric sensors 10 and 20 to output sensing signals which are equal or different in phase almost at the same time and for an equal period of time, when a human body approaches the image forming apparatus 5 moving in a direction Q perpendicular to the plane 51 of the image forming apparatus 5 (the direction Q, in which a human body could be moving toward or away from the image forming apparatus 5, will be referred to as "approaching/separating direction Q"). Calculating a sum of or difference between the sensing signals from the first and second pyroelectric sensors makes it possible to achieve a high accuracy in detecting a human body approaching based on the combination of the output signals which is greater than that supposed to be outputted from one of the pyroelectric sensors.

In order to obtain the results, the first virtual line 100c connecting the first positive and negative fields 100a and 100b and the second virtual line 200c connecting the second positive and negative fields 200a and 200b may have a point of intersection in the end region of themselves instead of in the middle of themselves and may have a point of intersection only on extended parts of themselves instead of on themselves.

In this mode of implementation, the first positive field 100a and the second positive field 200a are separately aligned in the approaching/separating directions Q; and the same is true for the first negative field 100b and the second negative field 200b. Meanwhile the first positive field 100a and the second negative field 200b are separately aligned in directions R parallel with the plane 51 of the image forming apparatus 5 (the directions R, in which a human body could pass through the image forming apparatus 5, will be referred to as "traverse directions Q") and also symmetric with respect to the perpendicular line L; and the same is true for the first negative field 100b and the second positive field 200a. That allows the first and second pyroelectric sensors 10 and 20 to output sensing signals which are different in phase when a human body moving toward the image forming apparatus 5 in the approaching direction Q.

Figure 5:
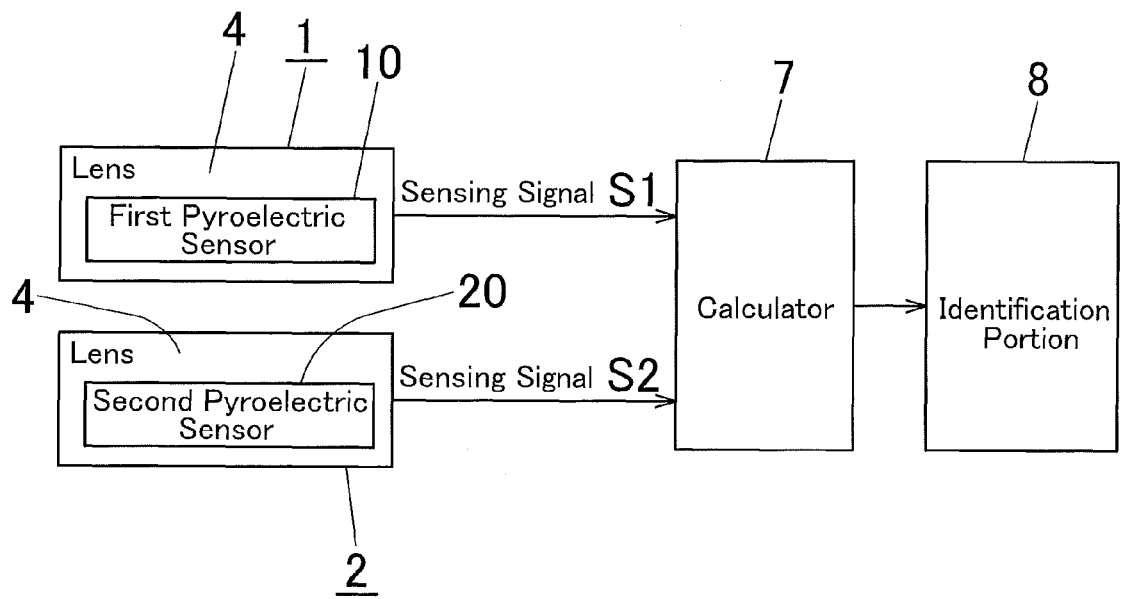
FIG. 5 is a block diagram illustrating an identification circuit to perform processing on output signals from the first and second pyroelectric sensors and identify the direction in which a human body is moving.

FIG. 5 is a block diagram illustrating an identification circuit to perform processing on output signals from the first and second pyroelectric sensors 10 and 20 and identify the direction in which a human body is moving.

The identification circuit is provided with: a calculator 7 calculating output signals from the first and second pyroelectric sensors 10 and 20; and an identification portion identifying the direction in which a human body is moving. The functions of the calculator 7 and the identification portion 8 are achieved by a computer system having a CPU, a RAM, and the like.

Figures 6A, 6B:
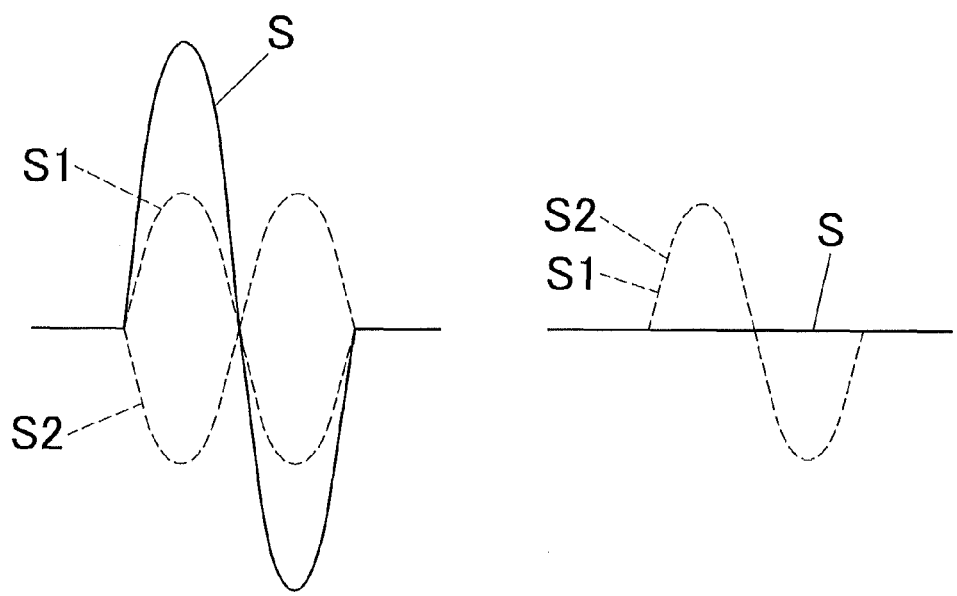
FIGS. 6A and 6B are charts illustrating waveforms of sensing signals, explaining how to identify the direction in which a human body is moving based on the sensing signals.

To explain an example, when a human body moving toward the image forming apparatus 5 in the approaching direction Q across the sensing block 300 of the sensing area 6 as illustrated in FIG. 4A, the first pyroelectric sensor 10 detects a change in infrared energy to output a sensing signal S1 as illustrated in FIG. 6A. Meanwhile, the second pyroelectric sensor 20 also detects a change in infrared energy to output a sensing signal S2 which is different in phase from the sensing signal S1 as illustrated in FIG. 6A, as the same time as the first pyroelectric sensor 10 outputs the sensing signal S1, because: the first virtual line 100c connecting the first positive and negative fields 100a and 100b and the second virtual line 200c connecting the second positive and negative fields 200a and 200b are symmetric with respect to the perpendicular line L; the first and second positive fields 100a and 200a are separately aligned in the approaching/separating directions Q; and the first and second negative fields 100b and 200b are separately aligned in the approaching/separating directions Q.

Subsequently, the calculator 7 obtains an identification signal S as illustrated in FIG. 6A, by subtracting the sensing signal S2 of the second pyroelectric sensor 20 from the sensing signal S1 of the first pyroelectric sensor 10. The identification portion 8 then recognizes that a human body is moving toward the image forming apparatus 5, based on a maximum value of the identification signal S obtained by the calculator 7, and the like.

The identification signal S obtained by the calculator 7 has a maximum value greater than the sensing signal S1 and the sensing signal S2. This means that using a combination of the first and second pyroelectric sensors 10 and 20 would improve the sensitivity of detecting a human body and the identification accuracy of the identification portion 8.

To explain another example, when a human body passes through the image forming apparatus 5 in a traverse direction R across the sensing block 300, the first pyroelectric sensor 10 detects a change in infrared energy to output a sensing signal S1 as illustrated in FIG. 6B. Meanwhile, the second pyroelectric sensor 20 detects a change in infrared energy to output a sensing signal S2 which is equal in phase with the sensing signal S1, at the same time as the first pyroelectric sensor 10 outputs the sensing signal S1.

Subsequently, the calculator 7 obtains an identification signal S as illustrated in FIG. 6B, by subtracting the sensing signal S2 of the second pyroelectric sensor 20 from the sensing signal S1 of the first pyroelectric sensor 10. In this example, the calculator 7 does not output an identification signal S because the sensing signals S1 and S2 are equal in phase.

When a human body moves toward the image forming apparatus 5, the calculator 7 receives the sensing signals S1 and S2 which are different in phase from the first and second pyroelectric sensors 10 and 20, and this is why the calculator 7 subtracts the sensing signal S2 from the sensing signal S1. And obtaining an identification signal S with a greater maximum value in this way above would improve the sensitivity of detecting a human body moving in the approaching direction. A human body is usually considered to move in the approaching direction to use the image forming apparatus 5. It is therefore preferred for the image forming apparatus 5 to immediately recognize if a human body moves in the approaching direction, in order to get prepared for user operation being back to normal operation mode from sleep mode.

Depending on the positions of their positive and negative fields 100a, 100b, 200a, and 200b, the first and second pyroelectric sensors 10 and 20 output the sensing signals S1 and S2 which are equal in phase when a human body moves toward the image forming apparatus 5. In this case, receiving the sensing signals S1 and S2 which are equal in phase, the calculator 7 simply calculates a sum of the sensing signals S1 and S2.

That is, when a user is moving toward the image forming apparatus 5, the calculator 7 obtains an identification signal S by calculating a sum of the absolute values of the sensing signals S1 and S2, regardless of whether the sensing signals S1 and S2 are equal or different in phase.

As described above, when a human body passes through the image forming apparatus 5, a difference between the sensing signals S1 and S2 is calculated to obtain a smaller identification signal S; and when a human body moves toward to the image forming apparatus 5, a sum of the sensing signals S1 and S2 is calculated to obtain a greater identification signal S. This would achieve a higher accuracy in detecting a human body approaching to the image forming apparatus 5.

Figure 7:
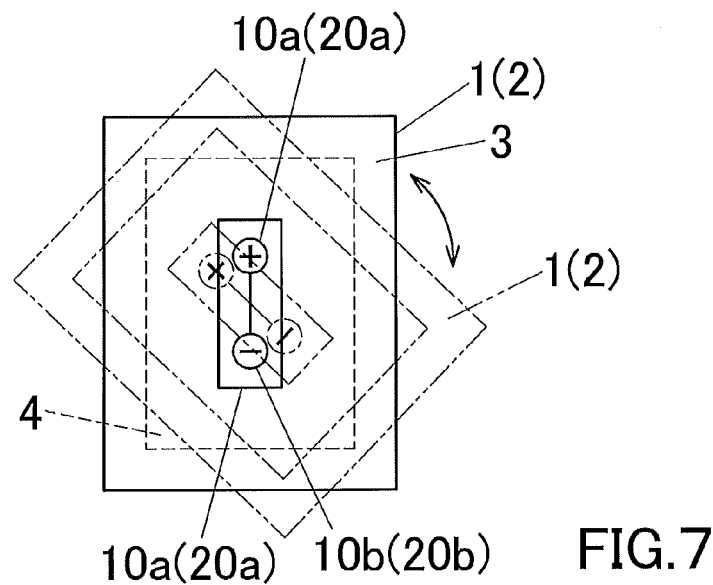
FIG. 7 is a view to explain that the first and second sensing devices are turned around by a certain degree on the plane of the image forming apparatus.
Figure 8:
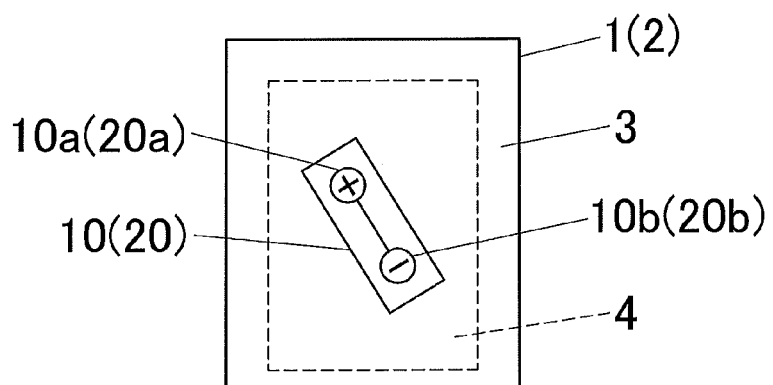
FIG. 8 is a view to explain that the first or second sensing device with its own pyroelectric sensor being turned around on a base plate by a certain degree is mounted on the image forming apparatus.

In order to adjust the detection accuracy in the sensing block 300, the sensing signals S1 and S2 may have their waveforms changed by turning around the first and second sensing devices 1 and 2 which are mounted on the plane 51 of the image forming apparatus 5 and thus changing the angle at the point of intersection of the first and second virtual lines 100c and 200c in the sensing block 300, as illustrated in FIG. 7. Alternatively, the sensing signals S1 and S2 may have their waveforms changed by turning around the first and second pyroelectric sensors 10 and 20 on the base plates 3 of the first and second sensing devices 1 and 2, respectively, and thus changing the angle at the point of intersection of the first and second virtual lines 100c and 200c in the sensing block 300, as illustrated in FIG. 8. Alternatively, the magnification ratios of the lenses 4 may be different between an approaching/separating direction Q and a traverse direction R.

Figure 9:
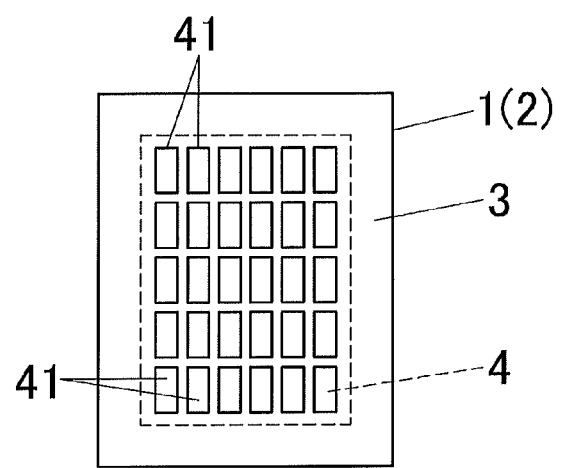
FIG. 9 is a two-dimensional view of the first or second sensing device if the image forming apparatus employs a fly-eye lens.

FIG. 9 relates to another mode of implementing the present invention. In this mode of implementation, the lenses 4 of the first and second sensing devices 1 and 2 are each composed of a fly-eye lens containing a lot of element lenses 41 arranged in vertical and horizontal directions. By adjusting the refractive indexes, the focal point distances, and the like of the element lenses 41, the first positive and negative fields 100a and 100b of the first pyroelectric sensor 10 and the second positive and negative fields 200a and 200b of the second pyroelectric sensor 20 are formed in the following manner.

That is, as illustrated in FIG. 10A, one sensing block 301 is formed by one pair of an element lens 41 of the first sensing device 1 and an element lens 41 of the lens 4 of the second sensing device 2 and thus a plurality of sensing blocks 301 are formed by a plurality of pairs of an element lens 41 of the first sensing device 1 and an element lens 41 of the second sensing device 2, in the sensing area 6 which constitutes a horizontal plane perpendicular to the plane 51 of the image forming apparatus 5.

Figure 4B:
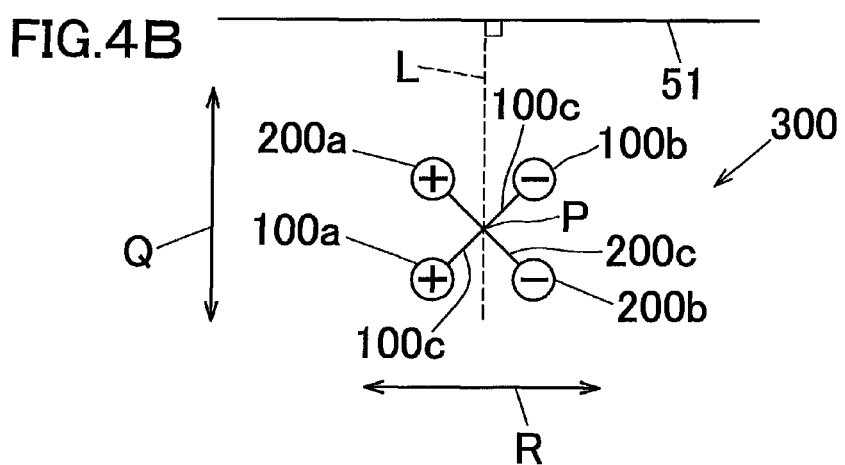
FIG. 4B is a two-dimensional view to explain the sensing block.

The sensing blocks 301 have an identical configuration with the sensing block 300 as illustrated in FIG. 4B. That is, as illustrated in FIG. 10B, the sensing blocks 301 include a first virtual line 100c connecting the first positive and negative fields 100a and 100b of the first pyroelectric sensor 10 and a second virtual line 200c connecting the second positive and negative fields 200a and 200b of the second pyroelectric sensor 20, while the first and second virtual lines 100c and 200c have an equal length and the point of intersection P almost in the middle of themselves. In the sensing area 6, the first and second virtual lines 100c and 200c are symmetric with respect to an axis corresponding to a line L perpendicular to the plane 51 of the image forming apparatus 5 and passing through the point of intersection P. The first and second virtual line 100c and 200c may have a point of intersection in the end region of themselves instead of in the middle of themselves and may have a point of intersection only on extended parts of themselves instead of on themselves.

In all the sensing blocks 301, the first positive field 100a and the second positive field 200a are separately aligned in the approaching/separating directions Q; and the same is true for the first negative field 100b and the second negative field 200b. Meanwhile the first positive field 100a and the second negative field 200b are separately aligned in the traverse directions R parallel with the plane 51 of the image forming apparatus 5 and also symmetric with respect to the perpendicular line L; and the same is true for the first negative field 100b and the second positive field 200a. That allows the first and second pyroelectric sensors 10 and 20 to output sensing signals which are different in phase when a human body moves toward the image forming apparatus 5.

As illustrated in FIG. 10A, a human body sensing device with a plurality of sensing blocks 301 being formed in the sensing area 6 is allowed to identify the direction in which a human body X is moving, by an identification circuit having the same configuration as that of FIG. 5. For example, when the human body X moves toward the image forming apparatus 5 in the approaching direction Q, the first and second pyroelectric sensors 10 and 20 output sensing signals which are different in phase, and the calculator 7 obtains an identification signal by calculating a difference between the sensing signals, and then the identification portion 8 identifies the direction in which the human body X is moving based on the identification signal.

In this mode of implementation, since there are a plurality of sensing blocks 301 in the approaching/separating directions Q in the sensing area 6, as the human body X approaches the image forming apparatus 5 more, there is a shorter distance between the human body X and the first and second pyroelectric sensors 10 and 20. Therefore, the identification signal S obtained by the calculator 7 gradually grows with peaks (maximum values) P1, P2, and P3 in this order because of the human body X passing through the sensing blocks 301, as illustrated in FIG. 11. This would achieve a higher accuracy in detecting a human body approaching to the image forming apparatus 5.

In the sensing blocks 301, the first virtual line 100c and the second virtual line 200c each connecting its own positive and negative fields may have a point of intersection at the midpoints of themselves, as illustrated in FIG. 10. In this case, the sensing blocks 301 which is formed by connecting the four positive and negative fields each other which are different in their shapes of a quadrangle results in a change in the detection accuracy in the sensing block 301.

Figures 12A, 12B, 12C:
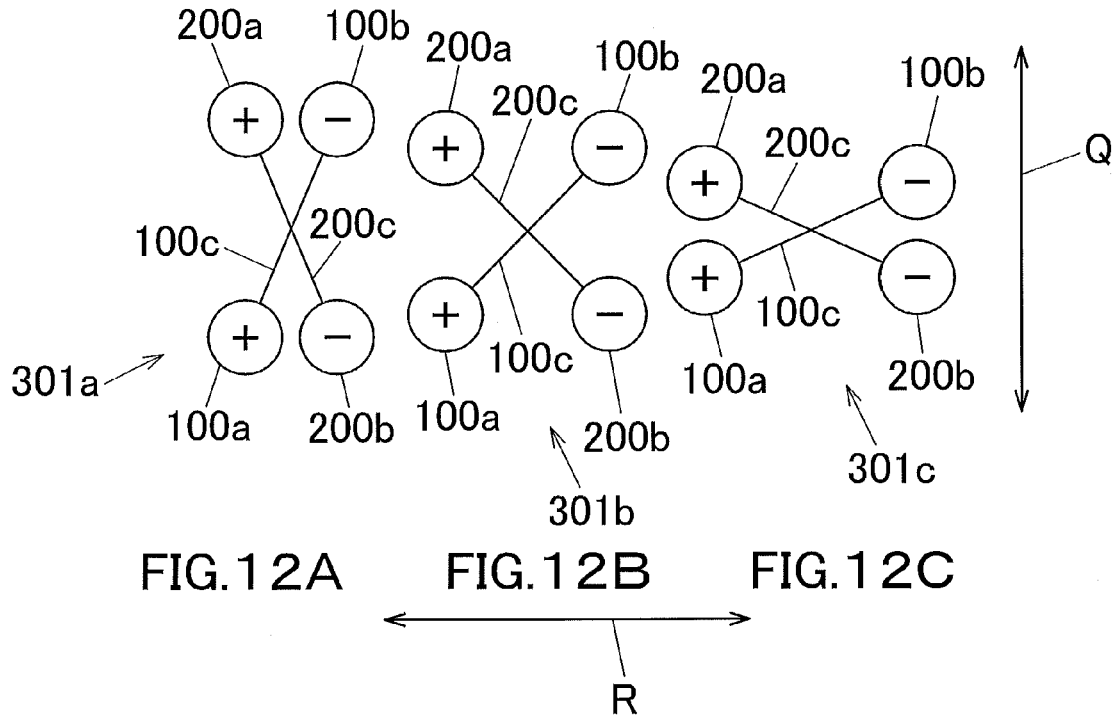
FIGS. 12A, 12B, and 12C are top views of sensing blocks in different shapes each having two pairs of a positive field and a negative field, explaining that the sensing blocks in different shapes have different levels in detection accuracy.

For example, the sensing block 301a which is formed in a rectangle with its longer side in the approaching/separating directions Q as illustrated in FIG. 12A; the sensing block 301b which is formed almost in a square as illustrated in FIG. 12B; and the sensing block 301c which is formed in a rectangle with its longer side in the traverse directions R as illustrated in FIG. 12C have different levels of detection accuracy. The first and second pyroelectric sensors 10 and 20 output large sensing signals when a human body moves toward the image forming apparatus 5 across the sensing block 301a; and the same is true for the case when a human body passes through the image forming apparatus 5 in a traverse direction R across the sensing block 301c. That is, detection accuracy in the approaching/separating directions Q is higher in the order of: the sensing blocks 301a, 301b, and 301c; and detection accuracy in the traverse directions R is higher in the order of the sensing blocks 301c, 301b, and 301a.

Making use of these characteristics, a plurality of sensing blocks in different shapes of quadrangle may be formed in the approaching/separating directions Q as illustrated in FIG. 10; more specifically, the sensing blocks 301c, 301b, and 301a may be formed in this order in the approaching direction Q. In such an example, as a human body gets closer to the image forming apparatus 5, the calculator 7 obtains a larger maximum value of the identification signal S by calculating a difference between the sensing signals S1 and S2 from the first and second pyroelectric sensors 10 and 20. This formation of the sensing blocks 301 would achieve a higher accuracy in detection in the approaching direction Q.

Also, a plurality of sensing blocks in different shapes of quadrangle may be formed in the traverse directions R; more specifically, the sensing blocks 301a, 301b, and 301c may be formed in this order in a traverse direction R, which makes it possible to recognize in which direction of the traverse directions R a human body is moving based on a change of the identification signal S.

Figure 13:
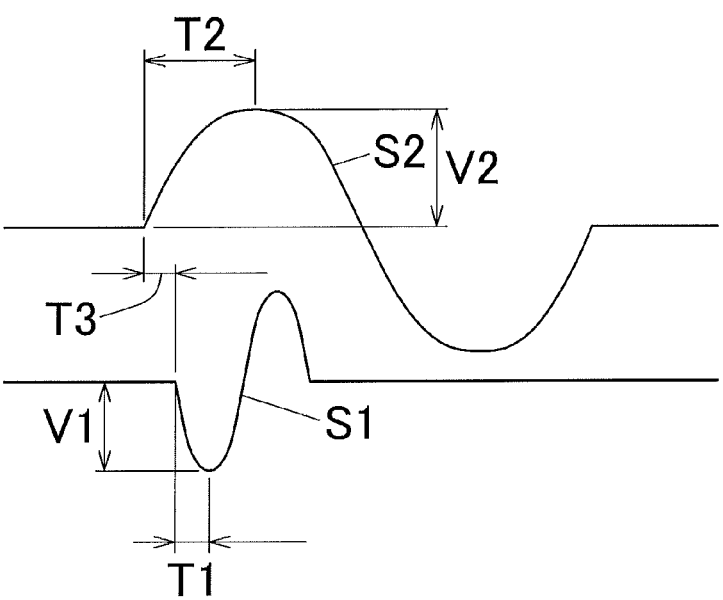
FIG. 13 is a chart illustrating waveforms of sensing signals, explaining how to recognize that a human body is diagonally moving toward or away from the image forming apparatus.

FIG. 13 is a view to explain how to recognize that a human body is diagonally moving toward the plane 51 of the image forming apparatus 5.

When a human body moves toward the plane 51 of the image forming apparatus 5 across the sensing block 300 of FIG. 4 or the sensing blocks 301 of FIG. 10, the first and second pyroelectric sensors 10 and 20 start to output the sensing signals S1 and S2 at different times with a time difference T3 as illustrated in FIG. 13. The time difference T3 depends on which pyroelectric sensor detects a change in temperature first. Based on the time difference T3, it is possible to identify in which traverse direction a human body is moving toward the plane 51 of the image forming apparatus 5. Meanwhile the sensing signals S1 and S2 reach different maximum values V1 and V2, at different times T1 and T2 which are counted from when the first and second pyroelectric sensors 10 and 20 start to output them, respectively. Based on the maximum values V1 and V2 and the times T1 and T2 counted from the start of outputting the sensing signals S1 and S2, it is possible to identify in which traverse direction (at which angle) a human body is moving.

FIG. 14 relates to another mode of implementing the present invention.

Figure 14A:
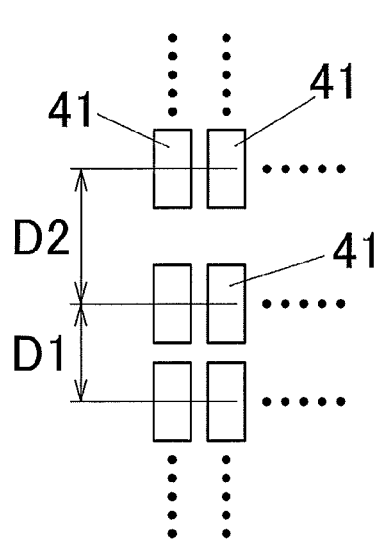
FIGS. 14A and 14B are views to explain that element lenses of the fly-eye lens are aligned at different lines per inch.
Figure 14B:
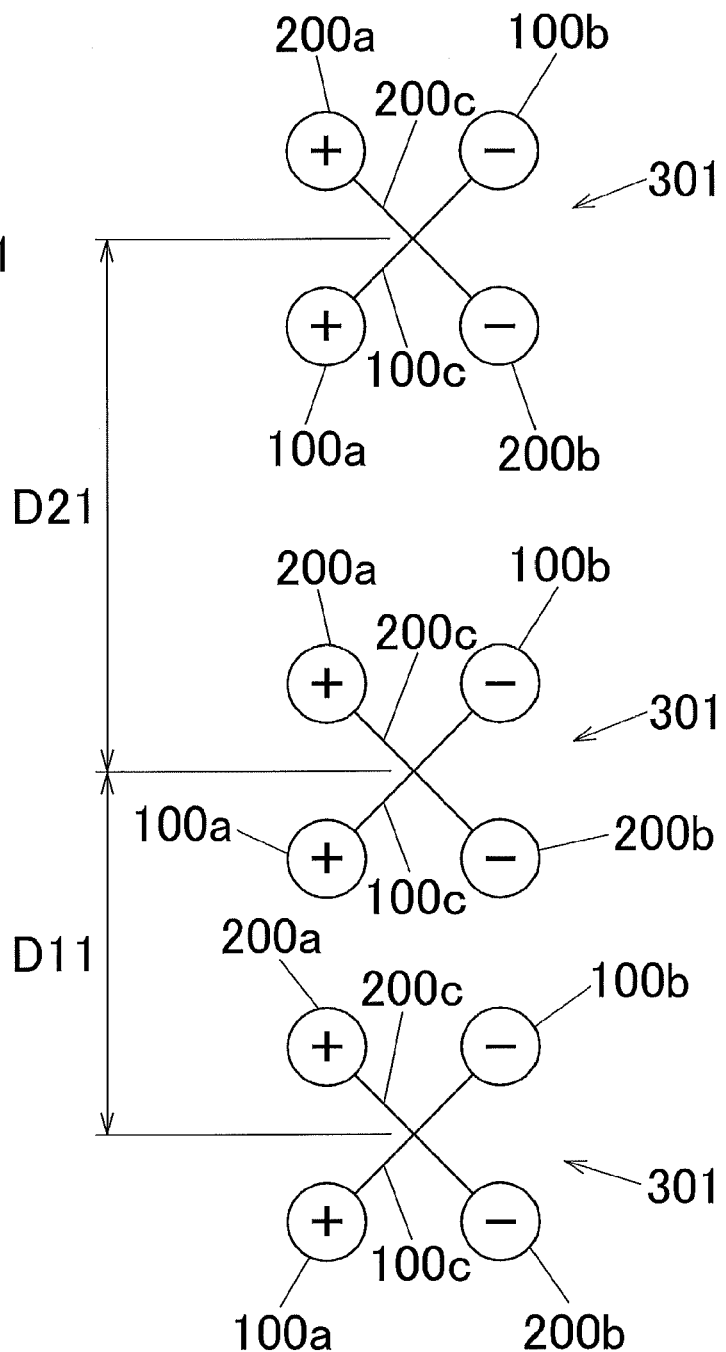

In this mode of implementation, the element lenses 41 of the fly-eye lens 4 are aligned at different lines per inch D1 and D2 in the approaching/separating directions Q as illustrated in FIG. 14A. The element lenses 41 aligned in this way above form a plurality of sensing blocks, the sensing blocks 301, at different lines per inch D11 and D12 in the approaching/separating directions Q as illustrated in FIG. 14B, which would achieve a higher accuracy in detection.

The element lenses 41 of the fly-eye lens 4 may be aligned at different lines per inch in the traverse directions R instead of in the approaching/separating directions Q. Alternatively, the element lenses 41 of the fly-eye lens 4 may be aligned at different lines per inch both in the approaching/separating directions Q and the traverse directions R.

Some modes of implementing the present invention have been described in the foregoing specification, which does not mean that the present invention shall be construed as limited to the particular forms disclosed. For example, the sensing devices 1 and 2 are each provided with the lens 4 in this mode of implementation. Alternatively, the first and second pyroelectric sensors 10 and 20 may share one lens.

The present invention having been described above may be applied to the following modes.

[1] A human body sensing device being mounted on an object, the body sensing device comprising:
a first and second pyroelectric sensor being mounted on a vertical plane of the object and each having a pair of a positive and negative electrode; and
a lens covering over the first and second pyroelectric sensors,
wherein:
the lens forms a sensing block in a sensing area constituting a plane perpendicular to the vertical plane of the object, the sensing block including a first positive and negative field corresponding to the positive and negative electrodes of the first pyroelectric sensor, and a second positive and negative field corresponding to the positive and negative electrodes of the second pyroelectric sensor;
either a first virtual line connecting the first positive and negative fields or an extended part thereof and either a second virtual line connecting the second positive and negative fields or an extended part thereof have a point of intersection in the sensing area; and
the first and second virtual lines are symmetric with respect to an axis corresponding to a line perpendicular to the vertical plane of the object and passing through the point of intersection.

[2] The human body sensing device as recited in the aforementioned item [1], wherein the first and second virtual lines have the point of intersection in the sensing block.

[3] The human body sensing device as recited in the aforementioned item [1] or [2], wherein the lens is composed of a fly-eye lens containing a plurality of element lenses to form a plurality of the sensing blocks in the sensing area.

[4] The human body sensing device as recited in any of the aforementioned items [1] to [3], wherein changing both or either of the angle of the human body sensing device mounted on the vertical plane of the object and the angles of the first and second pyroelectric sensors installed on the human body sensing device results in a change of the angle at the point of intersection.

[5] The human body sensing device as recited in any of the aforementioned items [1] to [4], wherein the lens forms the sensing block at different magnification ratios between an approaching/separating direction perpendicular to the vertical plane of the object and a traverse direction parallel with the vertical plane of the object.

[6] The human body sensing device as recited in the aforementioned item [3], wherein the fly-eye lens contains the element lenses aligned at different lines per inch in both or either of an approaching/separating direction perpendicular to the vertical plane of the object and a traverse direction parallel with the vertical plane of the object.

[7] The human body sensing device as recited in any of the aforementioned items [1] to [6], further comprising an identification portion being configured to identify the direction in which a human body is moving based on sensing signals from the first and second pyroelectric sensors.

[8] The human body sensing device as recited in the aforementioned item [7], further comprising a calculator being configured to obtain a sum of the absolute values of the sensing signals from the first and second pyroelectric sensors by calculating a sum of or difference between the sensing signals when a human body moves toward the object having the human body sensing device, wherein the identification portion identifies the direction in which the human body is moving based on the results obtained by the calculator.

[9] The human body sensing device as recited in any of the aforementioned items [3] to [6], further comprising:
a calculator being configured to adjust output from the first and second pyroelectric sensors to obtain the absolute value of the same when a human body moves toward the object having the human body sensing device; and
an identification portion being configured to identify the direction in which a human body is moving based on the results obtained by the calculator,
wherein the identification portion identifies the direction in which the human body is moving based on the results obtained by the calculator from each of the plurality of the sensing blocks.

[10] The human body sensing device as recited in the aforementioned item [9], wherein:
there are the sensing blocks in an approaching/separating direction perpendicular to the vertical plane of the object; and
the identification portion recognizes that a human body is moving toward the object having the human body sensing device, if the maximum values of the results obtained by the calculator from each of the plurality of the sensing blocks indicate a gradual increase.

[11] The human body sensing device as recited in any of the aforementioned items [7] to [10], wherein the identification portion identifies the direction in which a human body is moving based on a time difference between receipt of the sensing signals from the first and second pyroelectric sensors, maximum amplitude values of the sensing signals, and the times when the sensing signals reach their maximum amplitude values.

[12] An image processing apparatus with the human body sensing device as recited in any of the aforementioned items [1] to [11], being amounted on a vertical plane of the image processing apparatus itself.

According to the invention described in the aforementioned item [1], a sensing block including: a first positive and negative field corresponding to a pair of a positive and negative electrode of the first pyroelectric sensor; and a second positive and negative field corresponding to a pair of a positive and negative electrode of the second pyroelectric sensor, is formed in a sensing area in which either a first virtual line connecting to the first positive and negative fields or an extended part thereof and either a second virtual line connecting to the second positive and negative fields or an extended part thereof have a point of intersection while being symmetric with respect to an axis corresponding to a line perpendicular to a vertical plane of the object. This configuration allows the first and second pyroelectric sensors to output sensing signals which are equal or different in phase almost at the same time when detecting a human body moving toward the human body sensing device. A sum of the sensing signals from the first and second pyroelectric sensors is calculated if they have an equal phase, and a difference between the sensing signals is calculated if they have different phases. And thereby the human body sensing device is allowed to detect a human body based on the combination of the sensing signals which is greater than that supposed to be outputted from one of the pyroelectric sensors and thus achieve a higher accuracy in detection.

Furthermore, this configuration also allows the first and second pyroelectric sensors to start to output sensing signals at different times and reach different maximum amplitude values of the sensing signals at different times, when detecting a human body diagonally moves toward the human body sensing device. And thus the human body sensing device is also allowed to identify the direction in which a human body is moving based on a time difference between receipt of sensing signals from the first and second pyroelectric sensors, maximum amplitude values of the sensing signals, and the times when reaching the maximum amplitude values.

According to the invention described in the aforementioned item [2], the human body sensing device is allowed to achieve a high accuracy in detecting a human body approaching.

According to the invention described in the aforementioned item [3], the human body sensing device is allowed to achieve a high accuracy in detection by the fly-eye lens forming a plurality of the sensing blocks.

According to the invention described in the aforementioned item [4], the human body sensing device is allowed to achieve a high accuracy in detection by optimizing both or either of the angle of the human body sensing device mounted on the vertical plane of the object and the angles of the first and second pyroelectric sensors installed on the human body sensing device.

According to the invention described in the aforementioned item [5], the human body sensing device is allowed to achieve a high accuracy in detection by the lens forming the sensing block at different magnification ratios between an approaching/separating direction and a traverse direction.

According to the invention described in the aforementioned item [6], the human body sensing device is allowed to achieve a high accuracy in detection by the fly-eye lens with the element lenses being aligned at different lines per inch in both or either of an approaching/separating direction and a traverse direction.

According to the invention described in the aforementioned item [7], the human body sensing device is allowed to identify the direction in which a human body is moving based on sensing signals from the first and second pyroelectric sensors.

According to the invention described in the aforementioned item [8], by calculating a sum of or difference between the sensing signals from the first and second pyroelectric sensors, the human body sensing device is allowed to achieve a high accuracy in detecting a human body approaching to the vertical plane based on the combination of the sensing signals which is greater than that supposed to be outputted from one of the pyroelectric sensors. According to the invention described in the aforementioned [9], the human body sensing device is allowed to identify the direction in which a human body is moving based on the results obtained from each of the plurality of the sensing blocks which is substantially more information than those supposed to be obtained from one of the sensing blocks, and thus achieve a high accuracy in detection.

According to the invention described in the aforementioned item [10], the human body sensing device is allowed to achieve a high accuracy in detecting a human body approaching to the human body sensing device itself.

According to the invention described in the aforementioned item [11], the human body sensing device is allowed to identify the direction in which a human body is moving based on a time difference between receipt of the sensing signals from the first and second pyroelectric sensors, maximum amplitude values of the sensing signals, and the times when the sensing signals reach their maximum amplitude values.

According to the invention described in the aforementioned item [12], the image processing apparatus is allowed to achieve a high accuracy in detecting a human body approaching and immediately exit sleep mode to get back to normal operation mode for a warm-up operation when detecting a user near the image processing apparatus itself.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A human body sensing device being mounted on an object, the human body sensing device comprising:
a first and second pyroelectric sensor being mounted on a vertical plane of the object and each having a pair of a positive and negative electrode;
a lens covering over the first and second pyroelectric sensors, wherein the lens is composed of a fly-eye lens containing a plurality of element lenses to form a plurality of sensing blocks in a sensing area;
a calculator configured to adjust output from the first and second pyroelectric sensors to obtain an absolute value of the same when a human body moves toward the object having the human body sensing device; and
an identification portion configured to identify a direction in which a human body is moving based on results obtained by the calculator from each of the plurality of sensing blocks,
wherein:
the lens forms the plurality of sensing blocks in a sensing area constituting a plane perpendicular to the vertical plane of the object, each sensing block including a first positive and negative field corresponding to the positive and negative electrodes of the first pyroelectric sensor, and a second positive and negative field corresponding to the positive and negative electrodes of the second pyroelectric sensor, the plurality of sensing blocks arranged in an approaching/separating direction perpendicular to the vertical plane of the object;
each sensing block arranged such that either a first virtual line connecting the first positive and negative fields or an extended part thereof and either a second virtual line connecting the second positive and negative fields or an extended part thereof have a point of intersection in the sensing area;
the first and second virtual lines are symmetric with respect to an axis corresponding to a line perpendicular to the vertical plane of the object and passing through the point of intersection; and
the identification portion recognizes that a human body is moving toward the object having the human body sensing device when maximum values of the results obtained by the calculator from each of the plurality of sensing blocks indicate an increase.

2. The human body sensing device as recited in claim 1, wherein the first and second virtual lines have the point of intersection in the sensing block.

3. The human body sensing device as recited in claim 1, wherein changing both or either of the angle of the human body sensing device mounted on the vertical plane of the object and the angles of the first and second pyroelectric sensors installed on the human body sensing device results in a change of the angle at the point of intersection.

4. The human body sensing device as recited in claim 1, wherein the lens forms the sensing block at different magnification ratios between an approaching/separating direction perpendicular to the vertical plane of the object and a traverse direction parallel with the vertical plane of the object.

5. The human body sensing device as recited in claim 1, wherein the fly-eye lens contains the element lenses aligned at different lines per inch in both or either of an approaching/separating direction perpendicular to a vertical plane of the object and the traverse directions parallel with the vertical plane of the object.

6. The human body sensing device as recited in claim 1, further comprising a calculator being configured to obtain a sum of the absolute values of the sensing signals from the first and second pyroelectric sensors by calculating a sum of or difference between the sensing signals when a human body moves toward the object having the human body sensing device, wherein the identification portion identifies the direction in which the human body is moving based on the results obtained by the calculator.

7. The human body sensing device as recited in claim 1, wherein the identification portion identifies the direction in which a human body is moving based on a time difference between receipt of the sensing signals from the first and second pyroelectric sensors, maximum amplitude values of the sensing signals, and the times when the sensing signals reach their maximum amplitude values.

8. An image processing apparatus comprising the human body sensing device as recited in claim 1.

* * * * *